(12) United States Patent
Girouard et al.

(10) Patent No.: US 6,954,548 B1
(45) Date of Patent: Oct. 11, 2005

(54) METHOD AND APPARATUS FOR PRESENTING IMAGES IN A DATA PROCESSING SYSTEM

(75) Inventors: Janice Marie Girouard, Austin, TX (US); Richard Alan Hall, Round Rock, TX (US); Neal Richard Marion, Georgetown, TX (US); Jeanne Kathleen Sparlin, Taylor, TX (US); Chun-Hsiang Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,174

(22) Filed: May 2, 2000

(51) Int. Cl.[7] ............................................... G06K 9/00
(52) U.S. Cl. ..................................... 382/166; 382/237
(58) Field of Search .............................. 382/162–167, 382/232–248; 358/504–540; 305/600–704

(56) References Cited

U.S. PATENT DOCUMENTS 5,684,895 A * 11/1997 Harrington .................. 382/233
6,285,458 B1 * 9/2001 Yada ........................ 358/1.15
6,362,836 B1 * 3/2002 Shaw et al. ................. 345/744
6,385,337 B1 * 5/2002 Klassen ...................... 382/166
6,707,939 B1 * 3/2004 Weinholz et al. ........... 382/164

FOREIGN PATENT DOCUMENTS

DE 19817720 A1 * 10/1999 ............ G06T 9/00
JP 408096141 A * 4/1996 ............ H04N 1/41

OTHER PUBLICATIONS

The OpenGL Graphics System: A Specification (Version 1.2); Segal et al.; Mar. 23, 1998.

* cited by examiner

Primary Examiner—Jingge Wu
(74) Attorney, Agent, or Firm—Duke W. Yee; Mark E. McBurney; Lisa L. B. Yociss

(57) ABSTRACT

A method and apparatus in a data processing system for processing graphics image. A determination is made as to whether the graphics image has more than two colors. The graphics image is compressed in response to an absence of a determination that the graphics image has more than two colors to form a compressed image. The compressed image is sent to a client.

28 Claims, 4 Drawing Sheets

METHOD AND APPARATUS FOR PRESENTING IMAGES IN A DATA PROCESSING SYSTEM

BACKGROUND OF THE INVENTION

1. Technical Field

The present invention relates generally to an improved data processing system and in particular to a method and apparatus for presenting an image in a data processing system. Still more particularly, the present invention provides a method and apparatus for generating an image at a server computer and presenting the image at a client computer.

2. Description of Related Art

X Window System is a windowing system, which runs under UNIX and all major operating systems. X Window System is also called "X Windows" and "X". X Windows lets users run applications on other computers in the network and view the output on their own screen. X Windows generates a rudimentary window that can be enhanced with graphical user interfaces (GUIs), but does not require applications to conform to a GUI standard. The window manager component of the GUI allows multiple resizable, relocatable X windows to be viewed on a screen at the same time.

X Windows software resides in the computer that performs the processing, such as a server machine, and X Windows software resides in the computer that displays the window, such as on a client machine.

Java is used with X Windows to provide applications to users over a network. Java has become a popular and prevalent language because Java allows for a program or application to run on many different types of platforms without having to created a version of the program or application for the native language used by each platform. Instead, a Java virtual machine (JVM) is used to provide multiplatform support. An application or program created using Java contains a set of bytecodes, which is run on all of the different types of platforms. The JVM executes bytecodes to avoid requiring the program or application to be in a form of native instructions normally used at a particular platform.

In using Java with X Windows, a default mode is present in which Java draws strings using thirty two or eight bits for each pixel. Normally, XGetImage and XPutImage calls are made to X Windows to obtain an image, the application integrates the new text into the original image, and the final image is displayed with a XPutImage call. XPutImage is a call used to combine an image with a rectangle of a drawable for immediate or later display. Windows and pixmaps may be used as destinations in graphics operations in the X windows system, collectively they are known as drawables. A pixmap is an example of a drawable and is an off-screen resource that is used for various operations, for example, defining cursors as tiling patterns or as the source for certain raster operations. Most graphics requests can operate either on a window or on a pixmap. A bitmap is a single bit-plane pixmap. XGetImage is used to return a pointer to a data structure, which contains the contents of a specified rectangle of a drawable in a specified format.

With respect to text, it would be desirable to draw one bit per pixel images with a transparent mode in which pixels in the background color are not drawn to the image. This feature allows for reduction in the amount of data required to be transferred between a client and a server. Also, delays in reading data from a client, transferring the data to the server, and delivering the data to the server applications would be reduced. X Windows does not directly support such a function or process.

Therefore, it would be advantageous to have an improved method and apparatus for drawing or displaying text images.

SUMMARY OF THE INVENTION

The present invention provides a method and apparatus in a data processing system for processing graphics image. A determination is made as to whether the graphics image has more than two colors. The graphics image is compressed in response to an absence of a determination that the graphics image has more than two colors to form a compressed image. The compressed image is sent to a client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
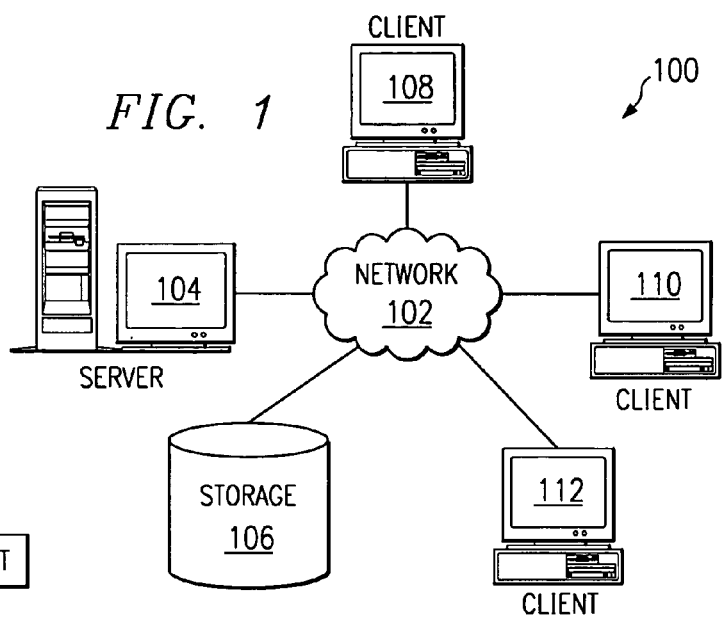
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104.

Distributed data processing system 100 may include additional servers, clients, and other devices not shown. In the depicted example, network 102 may be, for example, the Internet, representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a method, apparatus, and computer implemented instructions for transferring images between a server, such as server 104 and client 108. The mechanism of the present invention provides an ability to draw one bit per pixel images with a transparent mode in which pixels in the background color are not drawn to the image.

Figure 2:
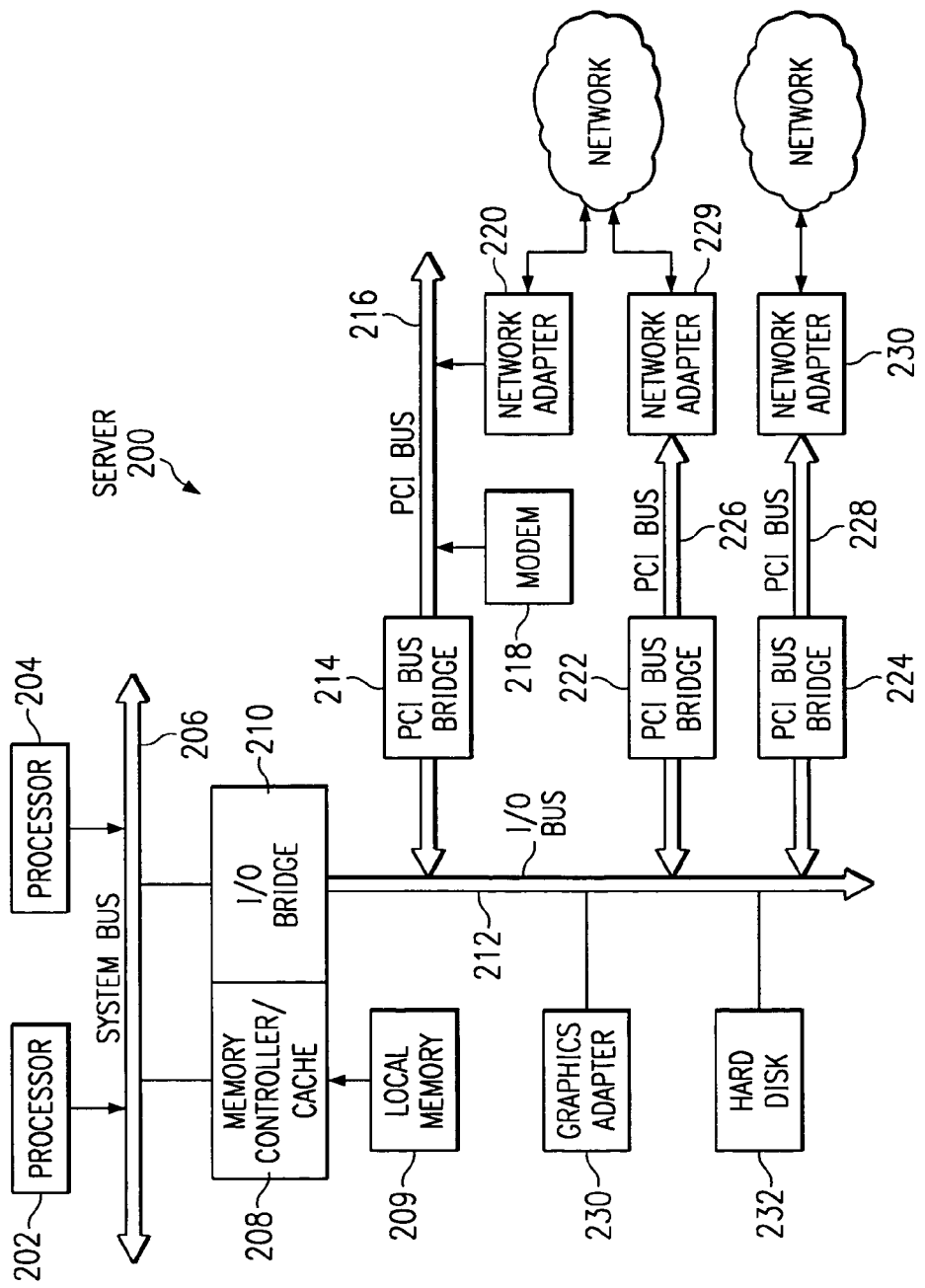
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters, such as Network adapter 229 and Network adapter 231 may be supported. In this manner, data processing system 200 allows connections to multiple network computers. A memory-mapped graphics adapter 230 and hard disk 232 may also be connected to I/O bus 212 as depicted, either directly or indirectly.

The architecture and components illustrated in FIG. 2 are not meant to imply architectural limitations to the present invention. The mechanism, in these examples, is implemented in data processing system 200 using Java.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
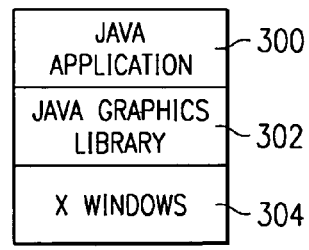
FIG. 3 is a diagram illustrating components used to process images in accordance with a preferred embodiment of the present invention.

With reference now to FIG. 3, a diagram illustrating components used to process images is depicted in accordance with a preferred embodiment of the present invention. The components shown in FIG. 3 are implemented in a server, such as server 104, in Figure in these examples.

Java application 300 draw images, such as strings or bitmaps, using Java graphics library 302, such as an Abstract Windowing Toolkit (AWT) library. The Java AWT library is part of a set of Java foundation classes (JVFC) that implement GUI components with a pluggable look and feel. Java graphics library 302 makes the appropriate calls to X Windows 304 to transfer the images to a client over a network connection. X Windows 304, in turn handles the actual formatting and transferring of images to the client or display adapter.

Java graphics library 302 is the component implementing the processes of the present invention in these examples. These examples, however, are not intended to imply architectural limitations as to where and how the processes may be implemented. The processes may be implemented in other types of libraries or in other components.

When an image is to be sent to a client, Java graphics library 302 determines whether the image is a two-color image. In particular, a determination is made as to whether the image includes a single color foreground and a single color background. In many cases, such an image is in the form of text, but also may be in the form of simple single color objects. If the image meets these parameters, the image is compressed and a call to draw the image into a pixmap is made. In these examples, Java graphics library 302 will perform compressing of the image.

Then, Java graphics library 302 places the compressed image into a pixmap by making a call to XPutImage in X Windows 304. The pixmap image is written into a stipple pattern for the screen with a XSetStipplePattern call. "A stipple pattern", as used herein in these examples, is a bitmap that is used to tile a region to serve as an additional clip mask for a fill operation with the foreground color. The XSetFillStyle is called with the parameter FillStippled to establish the fact that only the foreground color should be used (i.e. the drawing mode is transparent). XSetTSOrigin is called to identify the correct x,y location of the upper left hand corner of the image. And, finally, XFillRectangle is called to cause X to update the screen image with the newly created 1 bit per pixel (bpp) image. XSetFillStyle is called to return the stipple pattern to the original solid fill style. These calls are made by the processes in Java graphics library 302 to X Windows 304. All of the calls made by Java graphics library 302 in FIG. 3 are ones made to present available functions in X Windows. In the depicted examples, the XFillRectangle call causes the image to appear on the display is a drawRect call to X Windows 304. The drawrect XPutImage call results in the image being transferred to the client machine containing the server process. No calls are made to set the foreground and background in this Java scenario since they have been set by the Java Graphics library prior to requesting the display of this text. A sample AWT application call that would invoke this algorithm follows:

```
public void paint(Graphics g) {
    g.drawString("Hello World", 10,10);
}
```

Figure 4:
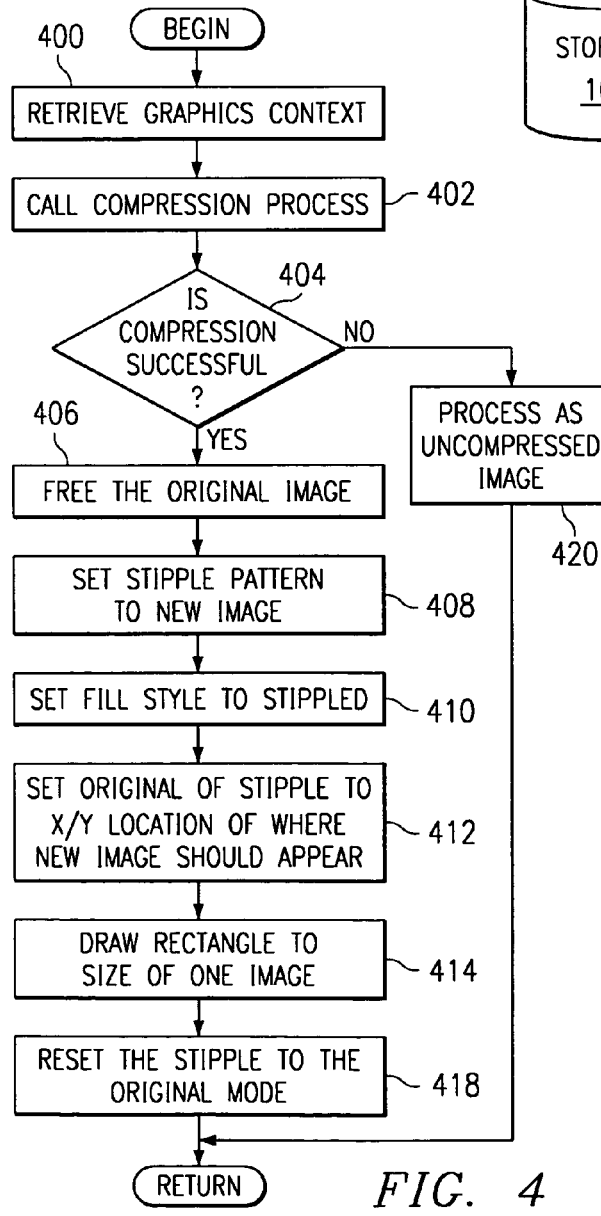
FIG. 4 is a flowchart of a process for presenting an image on a client in accordance with a preferred embodiment of the present invention.

With reference now to FIG. 4, a flowchart of a process for presenting an image on a client is depicted in accordance with a preferred embodiment of the present invention. The processes illustrated in FIG. 4 are located in a server, such as server 104 in FIG. 1. More specifically, these processes may be implemented in a Java graphics library, such as Java graphics library 302 in FIG. 3. The processes are initiated through a call received from a Java application, such as Java application 300 in FIG. 3.

The process begins by receiving a graphics context (step 400). A graphics context is a data structure in which most attributes of graphics operations are stored. These attributes include, for example, line width, line style, plane mask, foreground, background, tile, stipple, and clipping region. This information stored in a graphics context is used to determine the actual drawing operations. A compression process is called (step 402). A more detailed description of this compression process is presented with respect to the description of FIGS. 5A and 5B below. A determination is made as to whether the compression is successful (step 404). This determination is made, in these examples, by determining whether a true or false indication is returned by the compression process in step 402.

If the compression is successful, the original image is freed (step 406). A stipple pattern is set for the new image (step 408). The fill style is set to stipple (step 410). The origin of the stipple is set to the X, Y location of where the new image should appear (step 412). The rectangle having the size of one image is drawn (step 414). The stipple is then reset to the original mode (step 418) with the process terminating thereafter.

With reference again to step 404, if the compression process us unsuccessful, the image is processed as an uncompressed image (step 420) with the process terminating thereafter.

Figure 5A:
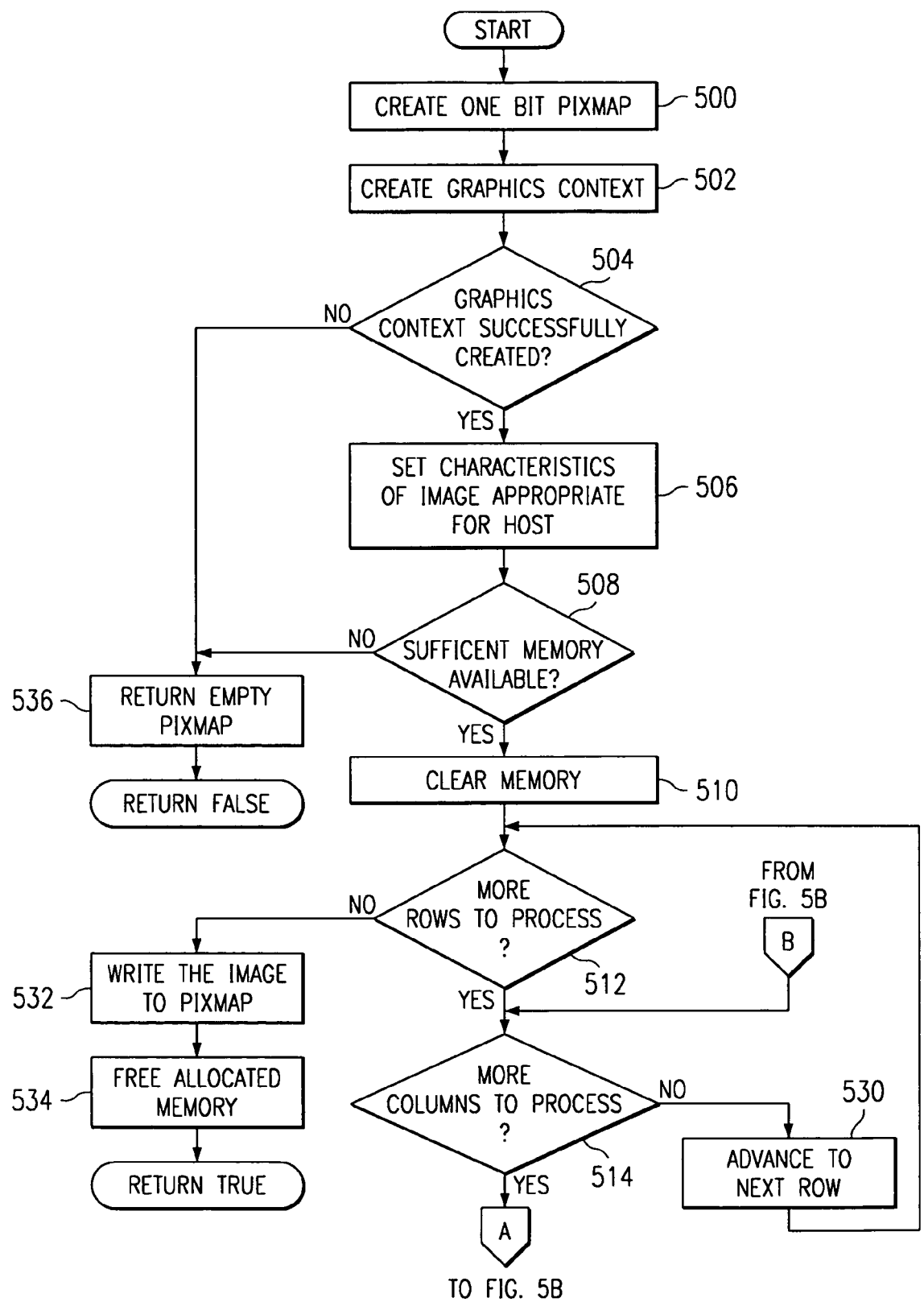
FIGS. 5A and 5B, depicts a flowchart of a process used to compress an image in accordance with a preferred embodiment of the present invention.
Figure 5B:
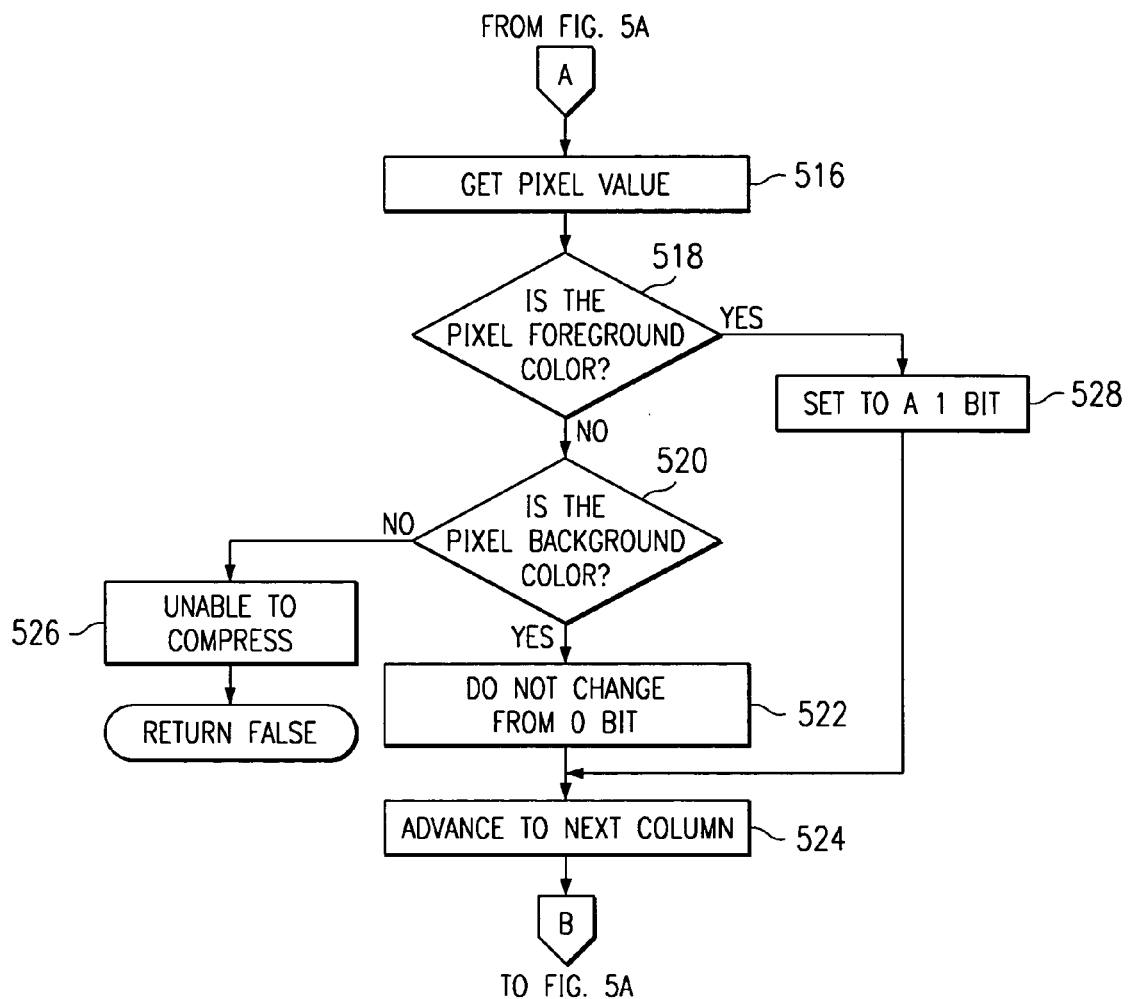

With reference now to FIGS. 5A and 5B, a flowchart of a process used to compress an image is depicted in accordance with a preferred embodiment of the present invention. The processes depicted in FIGS. 5A and 5B are a more detailed description of step 402 in FIG. 4.

The process begins by creating a one bit pixmap (step 500). In this example, the pixmap has all of the bits initially set equal to zero. A graphics context is created for drawing to the pixmap (step 502). A determination is made as to whether the graphics context was successfully created (step 504). If the graphics context is successfully created, then the characteristics of the image are set to ones appropriate for the host (step 506). The characteristics of an image are set in the XImage structure. The XImage structure is the Xlib standard structure that is capable of storing all of the data corresponding to a screen area or pixmap. The characteristics that should be set in the XImage structure are the height, width, depth, offset, format, byte_order, bitmap_unit, bitmap_bit_order, and bitmap_pad. These attributes vary from system to system and window to window. Values appropriate for the current environment are chosen.

Next, a determination is made as to whether sufficient memory is available to process the image (step 508). If sufficient memory is present, the memory is cleared (step 510). Then, a determination is made as to whether additional unprocessed rows are present for processing (step 512). If additional rows are present, a determination is made as to whether additional unprocessed columns are present in the row being processed (step 514). If additional columns are present for processing, a pixel value is obtained (step 516). This pixel value is for the particular row or column being processed.

A determination is made as to whether the pixel value is a foreground color (step 518). If the pixel value is not for a foreground color, a determination is made as to whether the pixel value is for a background color (step 520). If the pixel value is for a background color, the bit for the pixel in the pixmap remains a zero (step 522). The process then advances to the next column (step 524) with the process then returning to step 514 as described above.

With reference again to step 520, if the pixel value is not for a background color, then the image cannot be compressed (step 526) with the process returning a false indication. In this instance, the pixel value is for neither a foreground color nor a background color. In this case, an error or false indication is returned from the compression routine and the original, uncompressed image, will be displayed.

With reference again to step 518, if the pixel value is for a foreground color, the bit for the pixel is set to a one (step 528) with the process then proceeding to step 524 as described above. The bit is set in the pixmap itself. With reference again to step 514, if no more unprocessed columns are present, then the next unprocessed row is selected for processing (step 530) with the process then returning to step 512. The determinations in step 512 and 514 are made such that the pixmap is processed by selecting one row and moving across the row, column by column. After the entire row has been processed, another unprocessed row is selected for processing. With reference again to step 512, if no additional unprocessed rows are present, then the image is written to the pixmap (step 532). The allocated memory is then freed (step 534), and a true indication is returned.

With reference again to step 502, if the graphics context was not successfully created, an empty pixmap is returned (step 536), as well as a false indication. In addition in step 536, the 1 bpp pixmap created, and it's associated memory, is freed. The original, uncompressed image will be used in place of the pixmap.

Thus, the present invention provides a mechanism for drawing strings using one bit per pixel images in which a transparent mode is present with pixels in the background color remaining underway on the image. This mechanism provides an advantage over the presently available mechanisms for drawing strings using thirty two or eight bits per pixel. The advantages provided involves a reduction in the amount of data that has to be transferred from the server to the client to display an image and a reduction in the number of images transfered (the read is no longer needed). In these examples, reducing a thirty two or eight-bit per pixel image down to a one bit per pixel image provides a large reduction in the amount of data transferred to displayed text on a graphical user interface, such as X Windows. Of course, the mechanism of the present invention also may be applied to other types of images other than text images in which compression may be applied. For example, these processes also may be applied to any image including a single foreground color and a single background color. The process of the present invention applies to both 8 and 32 bit images. In addition, by calling XSetFillStyle with the parameter FillOpaqueStippled, the process can apply to binary colored images that are non transparent for example, the background color is set, and any pixels with this color are set to the background color on the screen.

Thus the present invention reduces the amount of data required to be transferred between the client and the server. This reduction is by 64 times the original data for 32 bpp (bits per pixel) (bpp) images and 16 times the original data for 8 bpp images. There is a 2× reduction for removing the GetImage, and a 32× or 8× reduction for reducing the size of the image to 1 bpp from 32 or 8 bpp respectively. Also, the present invention eliminates the delay associated with reading the data in from the client, transferring it to the server (which requires multiple copies of the data), and delivering it to the server application.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the processes of the present invention are described using Java and X Windows, these processes may be applied to other systems in which images are transferred from a server to a client for display. In fact, the processes of the present invention could be applied to a situation in which a server process and client process are located on the same data processing system. The performance gains also occur on a system in which the server process and client process are located on the same data processing system. Gains such as a 250 percent improvement in text performance can be achieved. This improvement may be magnified as advances in Java bytecode interpreters are made. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a graphics image that includes a plurality of pixels, multiple bits being utilized to represent each one of said plurality of pixels of said graphics image, the method comprising:
   determining whether the graphics image has only a single foreground color and a single background color;
   in response to a determination that the graphics image has only a single foreground color and a single background color, compressing the graphics image that uses multiple bits to represent each one of said plurality of pixels to form a compressed image that includes said plurality of pixels, said compressed image using only one bit to represent each one of said plurality of pixels, each one of said plurality of pixels of said graphics image continuing to be included in said compressed image, wherein a graphics image having multiple bits per pixel is reduced to an image having only one bit per pixel; and
   sending the compressed image to a client.

2. The method of claim 1, wherein the determining, compressing, and sending steps are performed in a server.

3. The method of claim 1, wherein the graphics image includes text.

4. The method of claim 3, wherein the text is located in a foreground having the foreground color and a transparent background is present in the graphics image having the background color.

5. The method of claim 1, wherein the client is connected to the data processing system by a network.

6. The method of claim 5, wherein the network is an Internet.

7. The method of claim 5, wherein the network includes at least one of a local area network, a wide area network, and an intranet.

8. The method of claim 1 further comprising:
   displaying the image in a graphical user interface at the client.

9. The method of claim 8, wherein the graphical user interface is X Windows.

10. A method in a data processing system for transferring images, each one of said images including a plurality of pixels, multiple bits being utilized to represent each one of said plurality of pixels of each one of said images, the method comprising:
    identifying a set of images for presentation at a client;
    determining whether each one of the set of images has only a single foreground color and a single background color;
    for each one of the set of images that has only a single foreground color and a single background color, compressing the image that uses multiple bits to represent each one of said plurality of pixels to form a compressed image that includes said plurality of pixels, said compressed image using only one bit to represent each one of said plurality of pixels, each one of said plurality of pixels continuing to be represented by said compressed image, wherein a graphics image having multiple bits per pixel is reduced to an image having only one bit per pixel; and
    transferring the set of compressed images to the client for display.

11. A distributed data processing system comprising:
    a network;
    a client connected to the network; and
    a server connected to the network, wherein the server receives a request from the client, determines whether a graphics image included in the request has only a single foreground color and a single background color, said graphics image including a plurality of pixels, multiple bits being utilized to represent each one of said plurality of pixels of said graphics image, in response to a determination that the graphics image has only a single foreground color and a single background color, compresses the graphics image that uses multiple bits to represent each one of said plurality of pixels to form a compressed image that includes said plurality of pixels, said compressed image using only one bit to represent each one of said plurality of pixels, each one of said plurality of pixels of said graphics image continuing to be included in said compressed image, wherein a graphics image having multiple bits per pixel is reduced to an image having only one bit per pixel, and sends the compressed image to the client over the network.

12. The data processing system of claim 11, wherein the graphics image includes text.

13. The data processing system of claim 11, wherein the text is located in a foreground braving the foreground color and a transparent background is present in the graphics image having the background color.

14. The data processing system of claim 11, including a processor unit that includes multiple processors.

15. The distributed data processing system of claim 11, wherein the network is an Internet.

16. The distributed data processing system of claim 11, wherein the network includes at least one of a local area network, a wide area network, and an intranet.

17. A data processing system for processing a graphics image that includes a plurality of pixels, multiple bits being utilized to represent each one of said plurality of pixels of said the data processing system comprising:

determining means for determining whether the graphics image has only a single foreground color and a single background color;

in response to a determination that the graphics image has only a single foreground color and a single background color, compressing means for compressing the graphics image that uses hanging multiple bits to represent each one of said plurality of pixels to form a compressed image that includes said plurality of pixels, said compressed image using only one bit to represent each one of said plurality of pixels, each one of said plurality of pixels of said graphics image continuing to be included in said compressed image, wherein a graphics image having multiple bits per pixel is reduced to an image having only one bit per pixel; and sending means for sending the compressed image to a client.

18. The data processing system of claim 17, wherein the determining means, compressing means, and sending means are implemented in a server.

19. The data processing system of claim 17, wherein the graphics image includes text.

20. The data processing system of claim 19, wherein the text is located in a foreground having the foreground color and transparent background is present in the graphics image having the background color.

21. The data processing system of claim 17, wherein the client is connected to the data processing system by a network.

22. The data processing system of claim 21, wherein the network is an Internet.

23. The data processing system of claim 21, wherein the network includes at least one of a local area network, a wide area network, and an intranet.

24. The data processing system of claim 17 further comprising:

displaying means for displaying the image in a graphical user interface at the client.

25. The data processing system of claim 24, wherein the graphical user interface is X Windows.

26. A data processing system for transferring images, each one of said images including a plurality of pixels, multiple bits being utilized to represent each one of said plurality of pixels of each one of said images, the data processing system comprising:

identifying means for identifying a set of images for presentation at a client;

determining means for determining whether each one of the set of images has only a single foreground color and a single background color;

for each one of the set of images that has only a single foreground color and a single background color, compressing means for compressing the image that uses multiple bits to represent each one of said plurality of pixels to form a compressed image that includes said plurality of pixels, said compressed image using only one bit to resent each one of said plurality of pixels, each one of said plurality of pixels continuing be represented by said compressed image, wherein a graphics image having multiple bits per pixel is reduced to an image having only one bit per pixel; and transferring means for transferring the set of images including the set of compressed images to the client for display.

27. A computer program product in a computer readable medium for processing a graphics image that includes a plurality of pixels, multiple bits being utilized to represent each one of said plurality of pixels of said graphics image, the computer program product comprising;

first instructions for determining whether the graphics image has only a single foreground color and a single background color;

in response to a determination that the graphics image has only a single foreground color and a single background color, second instructions for compressing the graphics image that uses multiple bits to represent each one of said plurality of pixels to form a compressed image that includes said plurality of pixels, said compressed image using only one bit to represent each one of said plurality of pixels, each one of said plurality of pixels of said graphics image continuing to be included in said compressed image, wherein a graphics image having multiple bits per pixel is reduced to an image having only one bit per pixel; and third instructions for sending the compressed image to a client.

28. A computer program product in a computer readable medium for transferring images, each one of said images including a plurality of pixels, multiple bits being utilized to represent each one of said plurality of pixels of each one of said images, the computer program product comprising:

first instructions for identifying a set of images for presentation at a client;

second instructions for determining whether each one of the set of images has only a single foreground color and a single background color;

for each one of the set of images that has only a single foreground color and a single background color, third instructions for compressing the image that uses multiple bits to represent each one of said plurality of pixels to form a compressed image that includes said plurality of pixels, said compressed image using only one bit to represent each one of said plurality of pixels, each one of said plurality of pixels continuing to be represented by said compressed image per pixel, wherein a graphics image having multiple bits per pixel is reduced to an image having only one bit per pixel; and fourth instructions for transferring the set of images including the set of compressed images to the client for display.

* * * * *

UNITED STATES PATENT AND TRADEMARK OFFICE
CERTIFICATE OF CORRECTION

| | |
|---|---|
| PATENT NO. | : 6,954,548 B1 |
| APPLICATION NO. | : 09/562174 |
| DATED | : October 11, 2005 |
| INVENTOR(S) | : Girouard et al. |

It is certified that error appears in the above-identified patent and that said Letters Patent is hereby corrected as shown below:

Col. 8, line 65: after "a foreground" delete "braving" and insert --having--.

Signed and Sealed this

Twenty-eighth Day of November, 2006

JON W. DUDAS
*Director of the United States Patent and Trademark Office*